Oct. 13, 1936.   F. S. BRAINARD   2,057,228
RATE RECORDING ATTACHMENT FOR INTEGRATING METERS
Filed Nov. 10, 1932
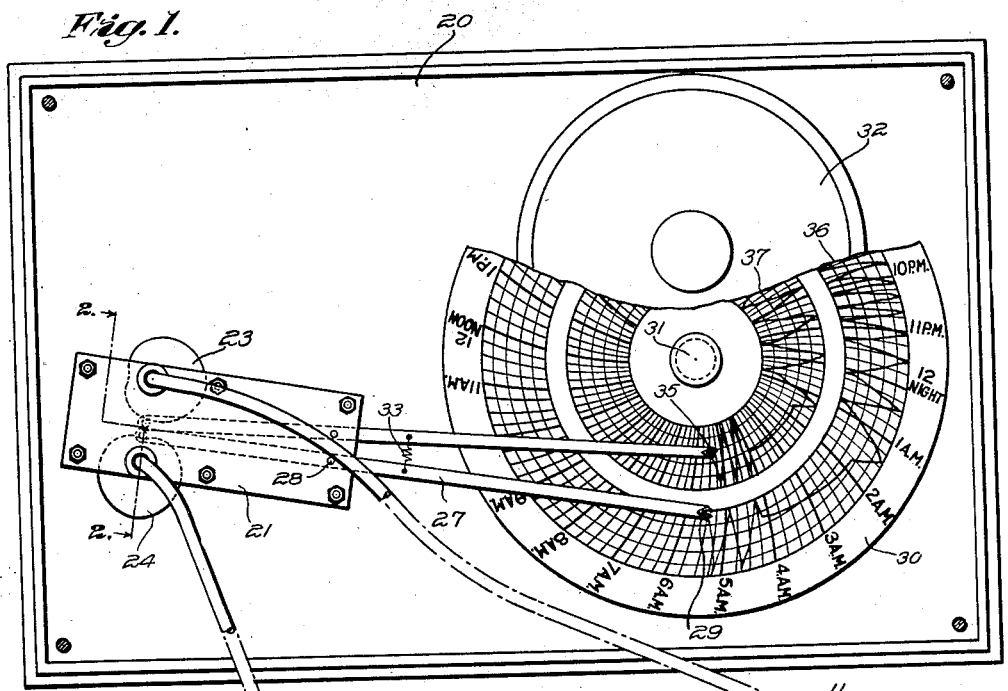
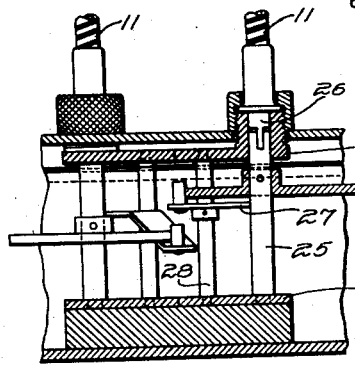
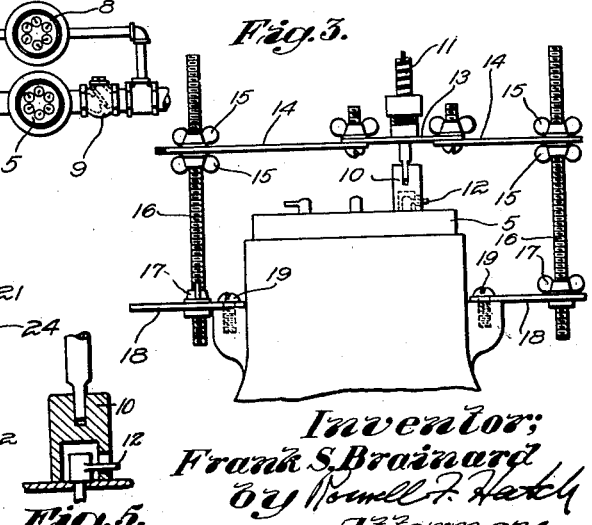
Inventor:
Frank S. Brainard
by Powell F. Hatch
Attorney Patented Oct. 13, 1936

2,057,228

UNITED STATES PATENT OFFICE 2,057,228

RATE RECORDING ATTACHMENT FOR INTEGRATING METERS

Frank S. Brainard, Hartford, Conn., assignor of one-fifth to Roswell F. Hatch, West Hartford, Conn.

Application November 10, 1932, Serial No. 641,978

6 Claims. (Cl. 234—1)

This invention relates broadly to meters for indicating the volume or quantity of any material or form of energy, but more specifically it consists of an attachment capable of application to any integrating meter having a moving indicator by which a time function may be introduced into the record, thereby producing a rate record.

While the invention is capable of application to any kind of an integrating meter, it is particularly useful in connection with the usual water meters. Therefore, a description of the invention as applied to a water meter will enable any skilled mechanic to make use of the invention in connection with any desired meter.

The usual water meter employed for domestic purposes and wherever water is measured for the purpose of charging the customer in accordance with the quantity used, indicates the total number of gallons or cubic feet that have passed therethrough. It is often necessary for the water company to determine not only the amount for which payment is to be made but also the rate at which water is being used at any or all hours of the day. Heretofore it has been necessary to install a special rate recording meter or, more commonly, to station a man with a stop watch beside the meter to make a series of observations. There are numerous occasions when it is of great importance to know the rate of flow. This is necessary in order to determine the maximum flow so as to check on meter and pipe sizes, to detect leakage, to detect the cause of abnormally large bills, and to check the accuracy of meters. The greatest need of a rate record is to determine the reason for what the user of water claims to be an excessive bill. A rate chart, for a twenty-four hour period, will indicate the time of abnormal use and through this the exact cause of an apparently excessive bill can be pointed out.

The object of the invention is to provide an inexpensive device which can be readily attached to any meter without changing the installation connections, which will make a coordinated record of time and volume—in other words, make a rate record from an integrating meter. Meters are commonly provided with a series of pointers and dials known as the "clock" and usually the pointers move with relation to the dials. In the present invention, a coupling is provided which engages the pointer and is rotated thereby. This coupling drives a device for translating rotary motion into approximately rectilinear motion, such as a cam mechanism. A tracing implement is carried thereby and arranged to make a record on a chronological chart graduated in units corresponding to those of the meter.

A meter adapted to record large-volume flow will fail to record small flows. For example, a meter for recording the flow in an eight inch pipe, might not be actuated by the opening of a one-half inch tap. Therefore, on large installations, it is usual to arrange a small by-pass around the large meter and to put a small-volume meter in the by-pass. A check valve keeps the larger pipe closed until the flow is great enough to actuate the large meter. The total flow is the sum of the reading of the two clocks, although it is to be understood that the two meters are sometimes built into one instrument. Such an arrangement is known as a compound meter.

A further object of the invention is to provide means for making a single rate chart from a compound meter. This is preferably a portable attachment similar to that previously set forth. This object is accomplished by providing a coupling for each clock and driving two independent tracing implements to make independent records on a single chronological chart.

A still further object is to provide a device of the character set forth, which can be readily attached to one or more meters by simply removing the cover or covers, and which cannot damage the delicate indicating mechanism of the meter. For this purpose, a freely adjustable mounting is provided which may be attached to the meter casing by the screws used to retain the meter cover and which will hold the coupling in operative relation with any one of the several pointers of a meter. Preferably a flexible drive shaft runs from the coupling to a separate base carrying the clock-driven chart and the tracing implement.

These features employed to the accomplishment of these objects and such others as may be apparent, will best be understood by reference to the following detailed description and accompanying drawing which disclose one embodiment of the invention, particularly adapted for use with a water meter.

Referring to the drawing,

Figure 1 is a plan view of the device as attached to a compound water meter, the cover being removed from the instrument;

Fig. 2 is a section taken on the line 2—2 of Fig. 1;

Fig. 3 is an elevation of the device for attaching the coupling in operative relation with one of the pointers on a water meter, Fig. 4 is a diagrammatic view of a compound meter such as is shown in Fig. 1, and Fig. 5 is an enlarged sectional view of the coupling and meter pointer.

When employed on a compound meter, the invention comprises two translating mechanisms which are substantially identical. As a matter of convenience the clocks of the two meters comprising a compound meter, are shown separate although, as previously stated, they are often combined in a single casing. A compound meter comprises a clock 5 of a meter inserted in a large-volume pipe 6 (Fig. 4). A by-pass 7 is arranged around this meter and in this by-pass is inserted a small-flow meter having a clock 8. A weighted check valve 9 is inserted in the pipe 6 so that until the volume of water becomes sufficient to lift the check valve 9, the flow passes through the by-pass 7 and actuates only the clock 8. When the flow of water becomes sufficient, the check valve 9 is lifted from its seat and an additional record is then made by the clock 5.

As shown in Fig. 1, one of the pointers, hands or needles of the clock 5 is connected by a coupling 10 with a flexible shaft 11. In order that the coupling may be placed in operative relation with a meter of any type and with any desired pointer on the clock, it is provided with a universally adjustable support so that the coupling can be positioned in cooperative relation with a pointer in any position.

The coupling 10 consists of a member having a central opening to receive the shaft of a pointer 12 and a radial slot to receive the pointer (see Fig. 5), so that when the pointer turns, the coupling is driven. The coupling is connected by a universal joint to the lower end of the flexible shaft 11, and the shaft is supported in a plate 13. In order that this plate carrying the lower end of the flexible shaft may be adjusted laterally and vertically in accordance with the particular meter, it is supported by two slotted plates 14 which are engaged between wing nuts 15 carried by two threaded studs 16. The lower ends of the studs are secured by wing nuts 17 in slotted arms 18. One end of each of the arms 18 is provided with an opening to receive screw threaded means such as screws 19 which may be inserted in the tapped holes used to secure the cover of the meter in place. In the drawing this cover has been removed. It will be apparent that by this construction, the coupling 10 can be adjusted vertically by means of the wing nuts 15 and the several slotted plates provide means for swinging the coupling laterally as may be desired so as to hold it in operative relation with any of the pointers as shown in Figs. 1 and 3.

The flexible shaft 11 preferably runs to a separate instrument base 20 shown in Fig. 1, (in which the cover has been removed), on which are rigidly mounted two plates 21 and 22 (Fig. 2). These plates carry two cams 23 and 24 which are substantially identical and therefore but one need be described. Cam 24 is mounted on a shaft 25, the upper end of which is slotted to receive a removable coupling 26 driven by the flexible shaft 11. This cam engages a roll on one end of a lever 27, pivoted at 28. The other end of this lever carries a tracing implement or stylus 29 which is arranged to make a record on a chart 30 mounted on a stud 31 driven by a clock mechanism 32. A spring 33 holds the two levers in engagement with their actuating cams.

Cam 24 is so shaped that one complete revolution of the pointer 12 will cause a complete oscillation of the lever 27. The chart 30 may be graduated circumferentially in accordance with the speed of the clock mechanism. As shown in the drawing, the chart is intended to be turned once in twenty-four hours. Therefore, if the pointer 12 is the ten-foot pointer on the meter, a complete oscillation of the tracing implement 29 will represent ten cubic feet of water, and the tracing made by the movement in one direction represents five cubic feet. The chart may be divided by circumferential line as shown in Fig. 1, in which case each space will represent one cubic foot.

The other meter is connected by a mechanism substantially identical with that described, to the tracing implement 35 and by this arrangement the volume of water flowing through the meter 8 is recorded, together with the time of the flow, on the outer portion 36 of the chart, while the volume and time of flow on the second meter 5 is recorded on the inner portion 37. A record has been shown on the chart for the purpose of illustration. This record shows that between 10:00 and 10:15 P. M. six cubic feet of water passed through the left hand meter and about two cubic feet of water passed through the right hand meter. This is shown by the number of circumferential spaces passed by the tracing implements during that time. Thus the total flow between 10:00 and 10:15 was eight cubic feet of water. By the way of further example, the chart indicates that between 2:00 and 4:00 A. M. there was no flow through the meter recorded on the inner portion 37. During this time the meter recorded on the outer portion 36 shows the passage of about two cubic feet of water. This small continuous flow at this particular time of the night may indicate a leakage or waste of water which could not be detected by the ordinary integrating meter. An examination of the chart will also indicate the time and duration of the maximum flow and, therefore, the sufficiency of the supply system may be estimated, which would be impossible from the recording of an integrating meter.

As a matter of convenience it is preferred to operate the instrument by a flexible shaft so that a small and light connection may be supported by the meter and the heavier instrument may be positioned as may be convenient on the floor or the wall. It will be apparent however that if desired, substantially the same construction might be mounted directly over the dial of the meter, thus substituting a rigid driving connection for the flexible shaft. It will also be apparent that various modifications may be made for adapting the broad idea of the invention to use with other kinds of meters. The chart may be provided with any desired graduations, both of time and flow, in accordance with the nature of that which is to be recorded. Also, the chart may have a single series of graduations if it is desired to use the invention with a meter having a single clock. It is to be understood that a single embodiment of the invention has been described for the purpose of illustration only, and the scope of the invention is to be determined solely by the appended claims.

What is claimed as new is:

1. In a recording attachment the combination with a meter having a movable pointer, a meter cover held in place by screw threaded means, and a movable chart to receive a record from a stylus, of a support for attachment to the meter by the screw threaded means, a plate carried by the support, means to adjust the plate with relation to the meter, a shaft operatively connected with the stylus and carried by said plate, and means for effecting a driving connection between the shaft and the pointer.

2. A driving connection adapted for use between a meter having a revolving pointer, and a tracing implement movable over a chronologically driven chart, comprising a shaft having one end in driving relation with the pointer, a bearing for the shaft, means for removably attaching the bearing to the meter, means for securing the bearing in adjusted position with relation to the pointer, and connections between the shaft and the tracing implement for driving the latter to make a record on the chart.

3. A driving connection for use between a meter having a plurality of revolving pointers and a tracing implement movable over a chronologically driven chart, comprising a shaft driven by a pointer, a bearing for the shaft, means for removably attaching the bearing to the meter and means for adjusting the bearing in a plane parallel to the plane of the pointers and perpendicular thereto, whereby one end of the shaft may be brought into driving relation with any desired pointer.

4. A driving connection for use between a meter having a revolving pointer, and a tracing implement movable over a chronologically driven chart, comprising a coupling supported solely by a meter part and revolved by the pointer, a flexible driving means between the coupling and the tracing implement, and a support at the meter for said driving means, adjustably positionable with respect to the meter.

5. In a recording attachment for connection to a meter of the hand and dial type said attachment having a time-driven chart and a cam actuated stylus for marking thereon, the combination of a plate, means for attaching said plate to the meter, means for positioning the plate with respect to the meter in a plane parallel to and in a plane vertical to the dial of said meter, a shaft for driving said cam, a bearing for said shaft in said plate and means for driving the shaft from the hand of the meter.

6. In a recording attachment for connection to a meter of the hand and dial type, said attachment having a time-driven chart and a stylus for marking thereon, the combination of a coupling supported by the dial and revolved by the hand, a flexible shaft having one end loosely engaging the coupling and driven thereby, a plate forming a bearing for the shaft, means for positioning the plate with respect to the meter in a plane parallel to and in a plane vertical to said dial, and actuating connections between the shaft and the stylus whereby the stylus is moved over the chart by the hand to make a mark on the chart.

FRANK S. BRAINARD.